United States Patent
Christian

(10) Patent No.: US 7,589,894 B2
(45) Date of Patent: Sep. 15, 2009

(54) APPARATUS FOR THE OPTICAL MANIPULATION OF A PAIR OF LANDSCAPE STEREOSCOPIC IMAGES

(75) Inventor: John Alexander Christian, Wimborne (GB)

(73) Assignee: Stereoscopic Optical Systems Limited (GB)

( * ) Notice: Subject to any disclaimer, the term of this patent is extended or adjusted under 35 U.S.C. 154(b) by 0 days.

(21) Appl. No.: 10/513,541

(22) PCT Filed: May 12, 2003

(86) PCT No.: PCT/GB03/02021

§ 371 (c)(1),
(2), (4) Date: Nov. 5, 2004

(87) PCT Pub. No.: WO03/098321

PCT Pub. Date: Nov. 27, 2003

(65) Prior Publication Data

US 2005/0141088 A1    Jun. 30, 2005

(30) Foreign Application Priority Data

May 16, 2002    (GB) .................................. 0211229.0

(51) Int. Cl.
  G02B 27/22    (2006.01)
  G02B 23/08    (2006.01)
(52) U.S. Cl. .................. 359/462; 359/464; 359/403
(58) Field of Classification Search .......... 359/462, 359/464, 466, 467, 469, 471, 472, 407, 431, 359/402, 403
See application file for complete search history.

(56) References Cited

U.S. PATENT DOCUMENTS

| | | | | |
|---|---|---|---|---|
| 2,693,128 A | * | 11/1954 | Dewhurst | 359/471 |
| 2,895,374 A | | 7/1959 | Price | |
| 3,019,698 A | * | 2/1962 | Sheldon | 352/60 |
| 3,990,087 A | * | 11/1976 | Marks et al. | 396/331 |
| 4,160,581 A | | 7/1979 | Weissler | |
| 5,596,363 A | | 1/1997 | Christian | |
| 5,943,165 A | | 8/1999 | Huang | |
| 6,603,876 B1 | * | 8/2003 | Matsuo et al. | 382/154 |

* cited by examiner

*Primary Examiner*—Audrey Y Chang
(74) *Attorney, Agent, or Firm*—Iandiorio Teska & Coleman

(57) ABSTRACT

Apparatus (204) for optical manipulation of a pair of landscape stereoscopic images, such that the side-by-side orientation needed by a pair of human eyes is reoriented to an orientation which is required for recording with a single camera. The apparatus comprises three periscopes (108, 124, 130), two of which are horizontally oriented and one which is vertically oriented. The side-byside view is reoriented to an arrangement with one picture above the other. To achieve this one side view is reflected by one horizontal periscope (108) with first and second reflectors (120, 122) to an upper picture position. The other side view is reflected by the vertical periscope (124) with third and fourth reflectors (126, 128) to a lower position, where another horizontal periscope (130) with fifth and sixth reflectors (132, 134) reflects the other side view of a lower picture position. Thus, the optical axis exit the third periscope (130) below the optical axis exit of the first periscope (108). The pictures may be recorded without rotating. The apparatus may be used to view pictures which are recorded one above the other.

6 Claims, 9 Drawing Sheets

APPARATUS FOR THE OPTICAL MANIPULATION OF A PAIR OF LANDSCAPE STEREOSCOPIC IMAGES

BACKGROUND OF THE INVENTION

This invention relates to apparatus for the optical manipulation of a pair of landscape stereoscopic images.

In Christian WO 01/56301 there is disclosed apparatus for the optical manipulation of a pair of landscape stereoscopic images. The apparatus re-orientates a pair of landscape stereoscopic images between a first orientation required for human viewing and a second orientation required for recording with a single camera or for reproduction from a single screen.

The present invention aims to further the concept of image re-orientation to produce apparatus suitable for operators who prefer to use a camera pointing at a photographic subject instead of sideways orientation.

BRIEF SUMMARY OF THE INVENTION

Accordingly, the present invention provides apparatus for the optical manipulation of a pair of landscape stereoscopic images, which apparatus comprises a housing, and optical re-orientation means positioned in the housing and for re-orientating the pair of landscape stereoscopic images between a first orientation selected from one of the orientations from the group consisting of top and bottom orientation and side-by-side orientation required for human viewing and a second orientation being the other orientation of the group required for recording with a single external camera positioned adjacent to the apparatus and viewed from a single screen, the single screen being such that it has a first pair of sides which are shorter than a second pair of sides, the second orientation being such that there is no top to bottom inversion of one of the landscape stereoscopic images with respect to the other of the landscape stereoscopic images, the second orientation being such that the landscape stereoscopic images are rotated for display in each of two halves of the single screen such that longest sides of the landscape stereoscopic images are parallel with the first pair of sides of the screen thereby maintaining a good aspect ratio without the need for compression or stretching of the pair of landscape stereoscopic images, and the optical re-orientation means being such that the pair of landscape stereoscopic images leave the optical re-orientation means in a direction which is parallel to a direction in which the pair of landscape stereoscopic images enter the optical re-orientation means, and the apparatus being characterised in that the optical re-orientation means comprises:

(i) a first periscope arrangement which is horizontally disposed, and which comprises first and second reflective surfaces;

(ii) a second periscope arrangement which is vertically disposed, which comprises third and fourth reflective surfaces, with the third reflective surface being the lower reflective surface for reflecting out image light towards the single camera; and (iii) a third periscope arrangement which is horizontally disposed, which comprises fifth and sixth reflective surfaces, wherein the fifth reflective surface is facing and aligned with the third reflective surface of the second periscope arrangement, and which is such that the sixth reflective surface is positioned underneath the second reflective surface so that the optical axis of the exit of the third periscope arrangement is directly underneath the optical axis of the exit of the first periscope arrangement.

The reflective surfaces may be prism reflective surfaces or mirror reflective surfaces.

The apparatus of the invention may be one in which the separation of two lenses, analogous to eye separation distance, is able to be varied below a maximum.

The apparatus of the invention may be one in which the left edges and the right edges of the stereoscopic pair of images are able to be aligned by rotation of the first reflective surface about a vertical axis.

At least some of the reflective surfaces may be located in blocks.

BRIEF DESCRIPTION OF THE SEVERAL VIEWS OF THE DRAWINGS

Embodiments of the invention will now be described solely by way of example and with reference to the accompanying drawings in which.

DETAILED DESCRIPTION OF THE INVENTION

Figure 1:
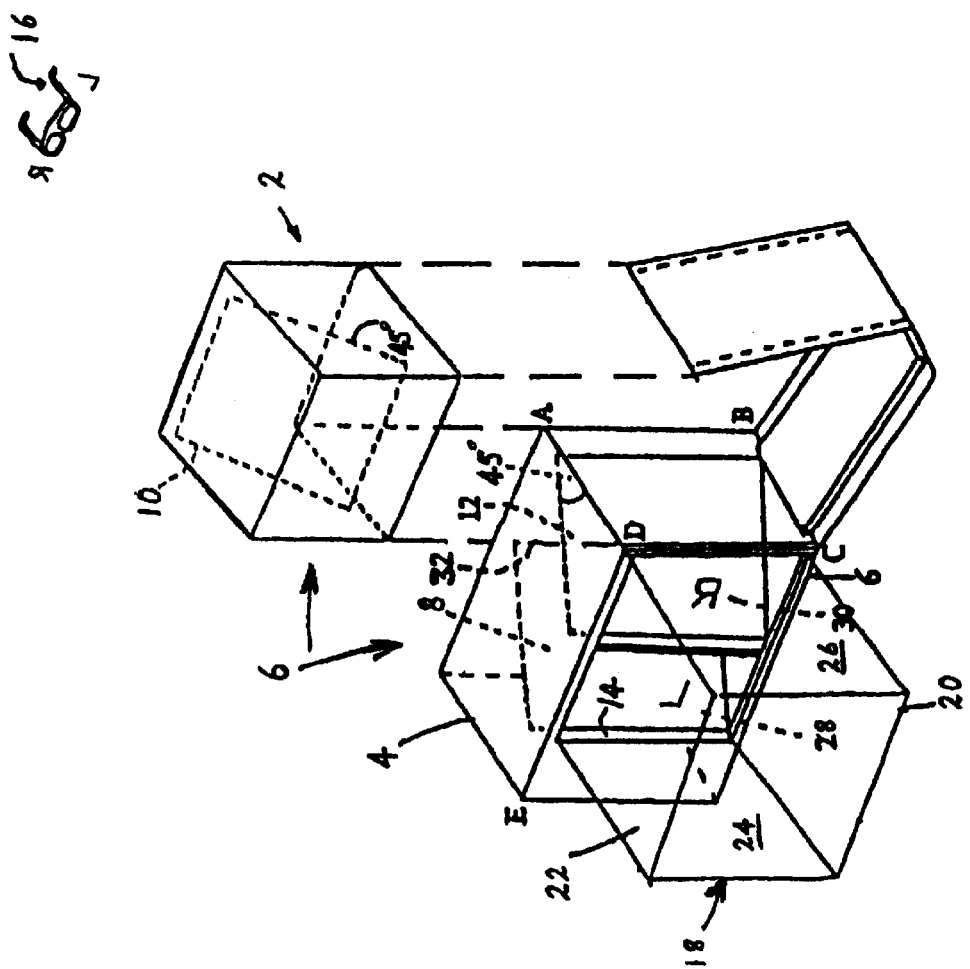
FIG. 1 shows first apparatus according to WO 01/56301 for the optical manipulation of a pair of landscape stereoscopic images.

Referring to FIG. 1, there is shown apparatus 2 for the optical manipulation of a pair of landscape stereoscopic images. The apparatus 2 comprises a housing 4 which is shown in exploded form for ease of understanding. The apparatus 2 also comprises optical re-orientation means 6 which is positioned in the housing 4 and which is for re-orientating the pair of landscape stereoscopic images between a first orientation required for human viewing and a second orientation required for recording with a single camera or for reproduction from a single screen, the single screen being such that it has a first pair of sides which are shorter than a second pair of sides. The second re-orientation is also such that there is no top to bottom inversion of one of the landscape stereoscopic images with respect to the other of the landscape stereoscopic images. The second orientation is further such that the landscape stereoscopic images can be rotated for display in each of two halves of the single screen such that the longest sides of the landscape stereoscopic images are parallel with the first pair of sides of the screen, thereby maintaining a good aspect ratio without the need for compression or stretching of the pair of landscape stereoscopic images.

The optical re-orientation means 6 is further such that the pair of landscape stereoscopic images leave the optical re-orientation means 6 in a direction which is parallel to a direction in which the pair of landscape stereoscopic images enter the optical re-orientation means 6.

As shown in FIG. 1, the optical re-orientation means 6 comprises two mirrors 8, 10 which just reflect light, and a mirror 12 which both reflects and transmits light. The mirror 12 is a half silvered mirror which reflects substantially 50% of the light and which transmits substantially 50% of the light. The optical re-orientation means 6 further includes polarising filters in the form of a polarising frame 14 and polarising spectacles 16. The mirror 12 may have a metal or a metallic-type material other than silver for giving the 50% reflection and the 50% transmission of the light.

Images are viewed via the polarising spectacles 16 from a television 18 having a base 20, a top 22 and sides 24, 26. The television 18 is thus standing in a normal upright position with its screen facing the housing 4.

The mirror 12 is positioned between the mirror 8 and the mirror 10. A first polarising filter 28 is positioned in the polarising frame 14 such that it is between the television screen and the mirror 8. A second and contrastingly polarised filter 30 is positioned in the polarising frame 14 such that it is between the television screen and the mirror 12.

The mirror 8 is hinged about an edge 32, allowing the viewing apparatus to adapt for a smaller screen size. The mirror 12 makes an angle of 45° as shown.

In the apparatus 2, the light path of the original image has been folded to avoid the need for rotating the display screen.

The upper mirror 10 may advantageously be hinged about its upper edge. Slight adjustment of its normal 45° angle then facilitates viewing from a variable vertical position.

Figure 2:
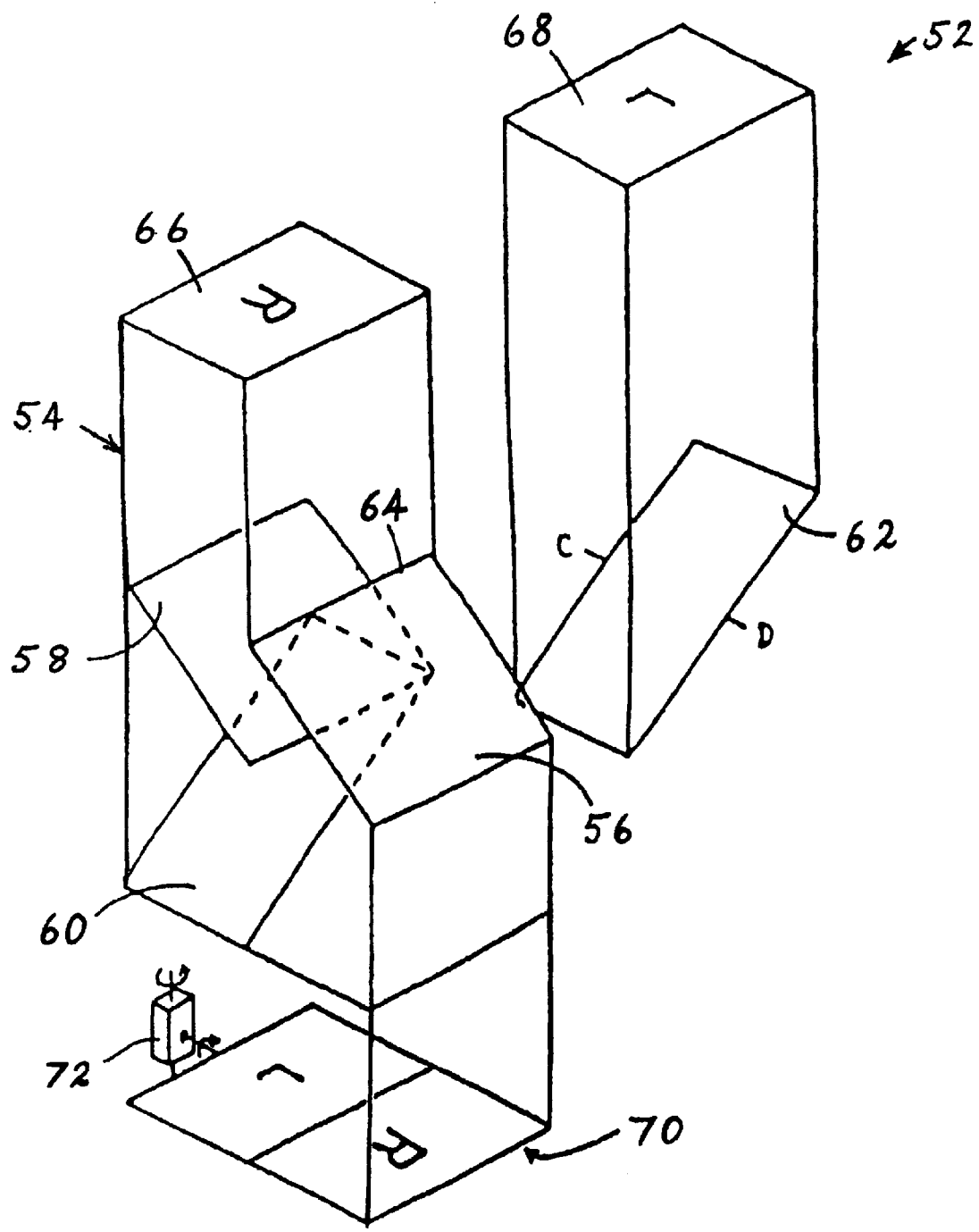
FIG. 2 shows second apparatus according to WO 01/56301 for the optical manipulation of a pair of landscape stereoscopic images.

Referring now to FIG. 2, there is shown second apparatus 52 for the optical manipulation of a pair of landscape stereoscopic images. The apparatus 52 comprises a housing 54 which is shown in exploded form for ease of understanding. The housing 54 contains mirrors 56, 58, 60 and 62. The mirrors 56, 60 are both mounted with their reflecting surfaces angled downwardly. The mirrors 58 and 62 are both mounted with their full reflecting surfaces angles upwardly. The mirror 56 may be rotatable about its upper edge 64 to enable stereoscopic viewing of a smaller picture display panel.

The mirror 62 may be rotated about a horizontal axis CD or, alternatively, its enclosure distance from a right eye arrangement 66 may be changed to facilitate a human brain merging the images from the right eye arrangement 66 to a left eye arrangement 68 for eye separations which differ. The axis CD may coincide with upper or lower horizontal mirror edges, or be intermediate.

Although the apparatus 52 is shown in exploded form for clarity, in practice, the apparatus 52, as with the apparatus 2, needs to exclude light from entering the eyes from anywhere but the appropriate part of the apparatus, in common with monoscopic use of a view finder. The optical re-orientation means needs to be enclosed, usually with the appropriate use of eye cups. Internal nor-reflective surfaces may be matt black. A vertical partition of the images may be essentially opaque and it may extend to the height and width of the mirror 60.

As can be seen from the lower part of FIG. 2, the pair of landscape stereoscopic images are marked L, R and they are provided on a screen 70 with a two-axes swivel mounting 72 by a camcorder (remainder not shown). The camera display screen is able to show such a pair of images by means of an optical manipulation camera attachment to the lens described in United Kingdom Patent No. 2236198. As can also be seen from FIG. 2, the images L, R are able to be seen one above the other, with the apparatus 52 enabling each image L, R to be directed separately to the appropriate eye, at the right eye arrangement 66 and the left eye arrangement 68, this being in the manner of looking downwards into a pair of binoculars.

The apparatus 52 offers the choice of viewing with or without polarising glasses 16. The glasses are no advantage in this case.

The apparatus 52 may be used with 180° rotation in principal, so that the eye-pieces become swapped over. The right eye image would be directly beneath the left eye-piece, instead of the left eye image on the screen being below the right eye-piece as shown in FIG. 2.

Figure 3:
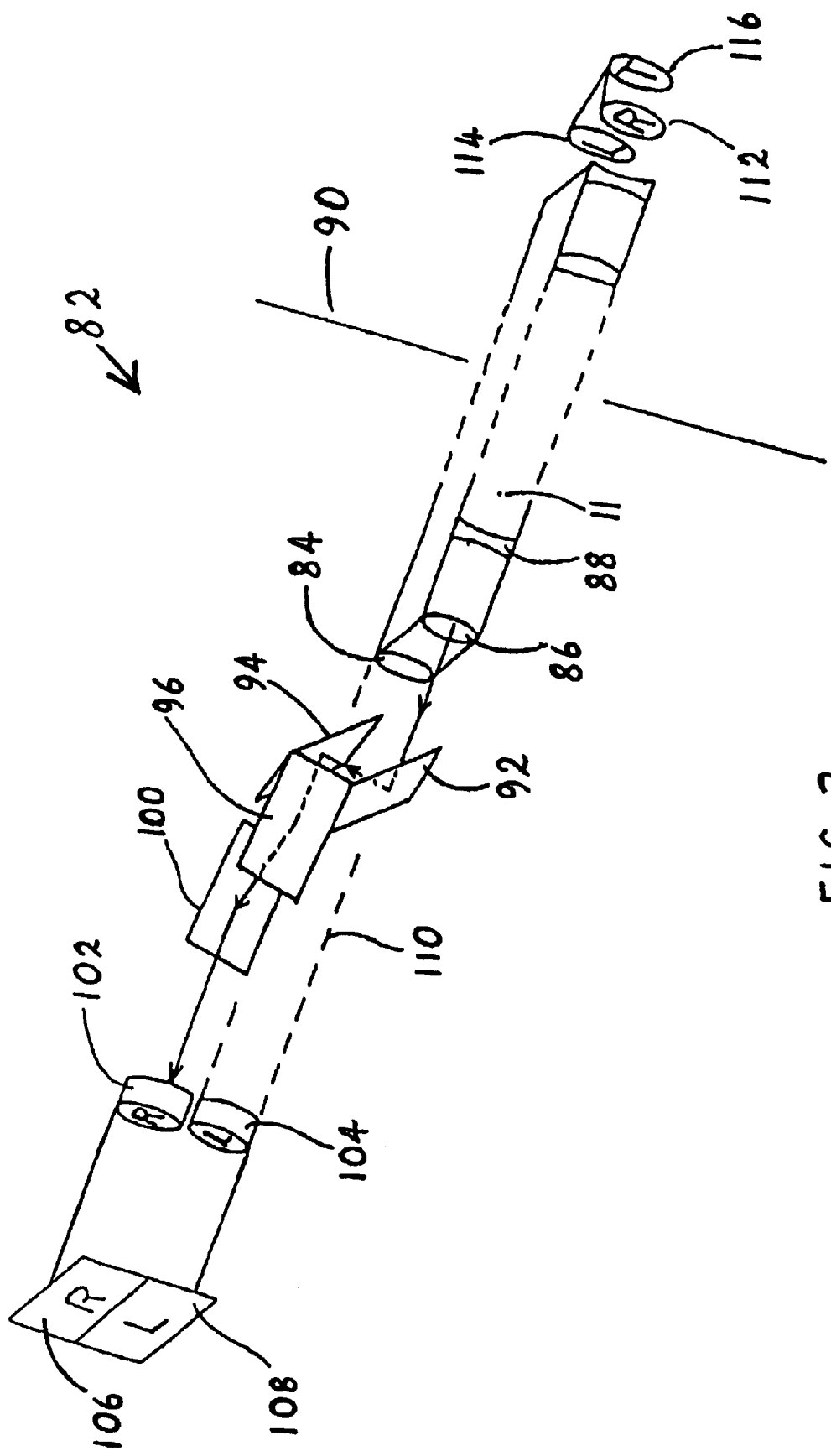
FIG. 3 shows third apparatus according to WO 01/56301 for the optical manipulation of a pair of landscape stereoscopic images.

Referring now to FIG. 3, there is shown apparatus 82 for the optical manipulation of a pair of landscape stereoscopies images. The apparatus 82 is in the form of an endoscope.

The apparatus 82 comprises an optical channel positive lens element 84 for the left eye view, and an optical channel positive lens element 86 for the right eye view. There is also an optical channel negative lens element 88 for the right eye view. A patient's body is shown schematically as body surface 90 and it will be seen that the right hand end of the apparatus 82 is in the patient, whilst the left hand end of the apparatus 82 is outside the patient.

The apparatus 82 further comprises a prism reflective surface 92 for the right eye view. This prism reflective surface 92 gives a first reflection which is upwards.

The apparatus 82 further comprises a prism reflective surface 94 for the right eye view. This prism reflective surface 94 gives a second reflection which is directed towards the surgeon. A prism reflective surface 96 for the right eye view gives a third reflection which is directed across and towards the left eye view optical axis, but above it. A prism reflective surface 100 for the right eye view provides a fourth reflection which is directed parallel to the left eye view channel, but directly above it.

Also shown in FIG. 3 are a positive lens element 102 at the camera end of the right eye view channel, and a positive lens element 104 at the camera end of the left eye view channel. A common focus 11 is shared by the relay elements 86, 88. The magnification is given by the ratio of the focal lengths.

The right eye view 106 and the left eye view 108 are captured simultaneously by a single camera. The reference numeral 110 is shown as a discontinuous line in the left eye view purely for clarity. The left eye channel is in principal a straight monoscopic endoscope.

The reference numeral 112 indicates a right eye view from the bottom patient end of the apparatus 82. The reference numeral 114 illustrates the left eye view from the bottom patient end of the apparatus 82. A common target 116 is shown being viewed by both the left and right eyes. The optical axes are made to converge on the common target 116.

Optical relays in the form of pairs of lenses are represented at both ends of the right eye channel to illustrate the principal. In reality, the optical relays may consist of standard endoscope rod lenses which repeat along the length of the endoscope.

Because the apparatus 82 shown in FIG. 3 is in the form of an endoscope, illumination would normally be required to be directed down the endoscope, for example by optical fibre bundles (not shown). The required illumination may be fed in from the side of the apparatus 82. A camera lead (not shown) may come in from the left of the apparatus 2.

Figure 4:
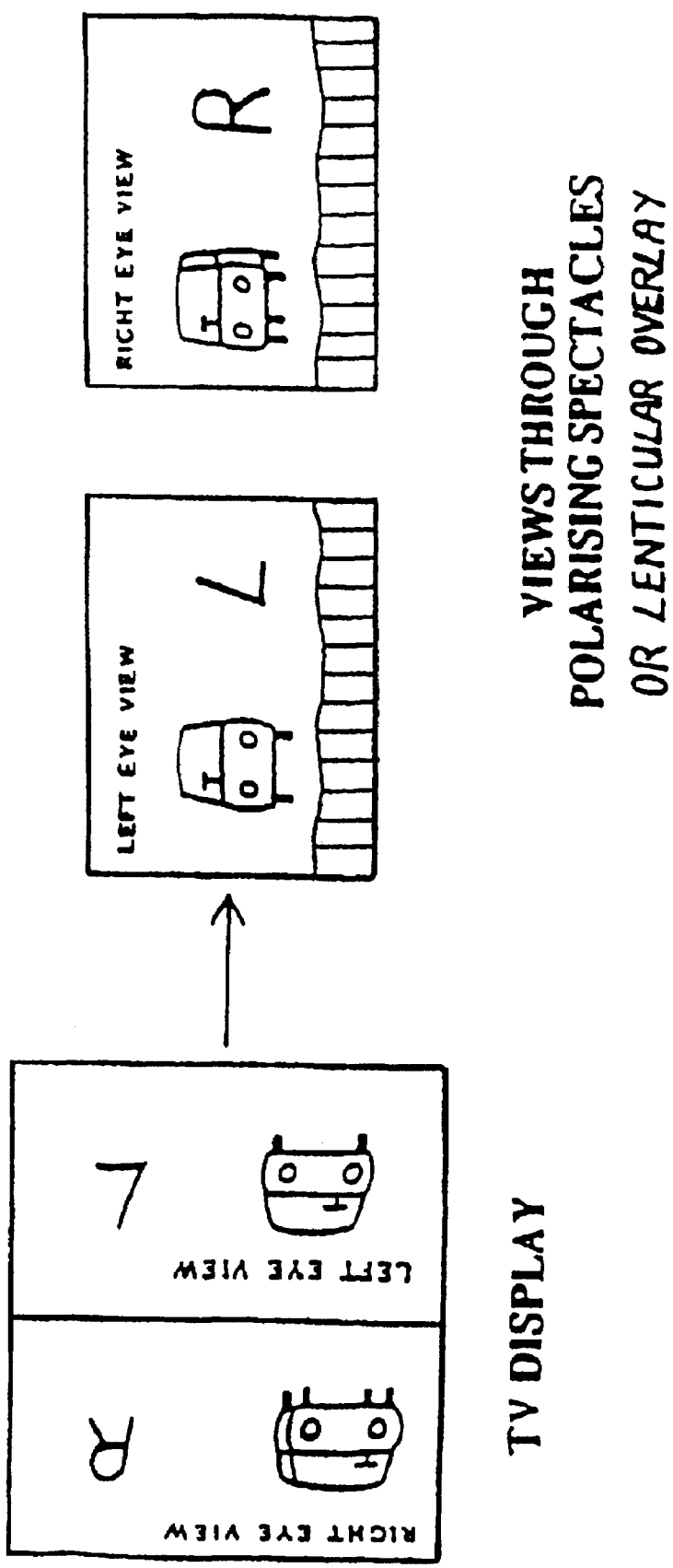
FIG. 4 shows how a television or monitor display according to WO 01/56301 can be viewed through polarising spectacles or a lenticular overlay.

FIG. 4 shows self-explanatory views of a television display through polarising spectacles or a lenticular overlay. The vertical strips at the bottom represent reassembled picture elements where the re-orientation of the images has been implemented in the manner of FIG. 5 of WO 01/56301.

Figure 5:
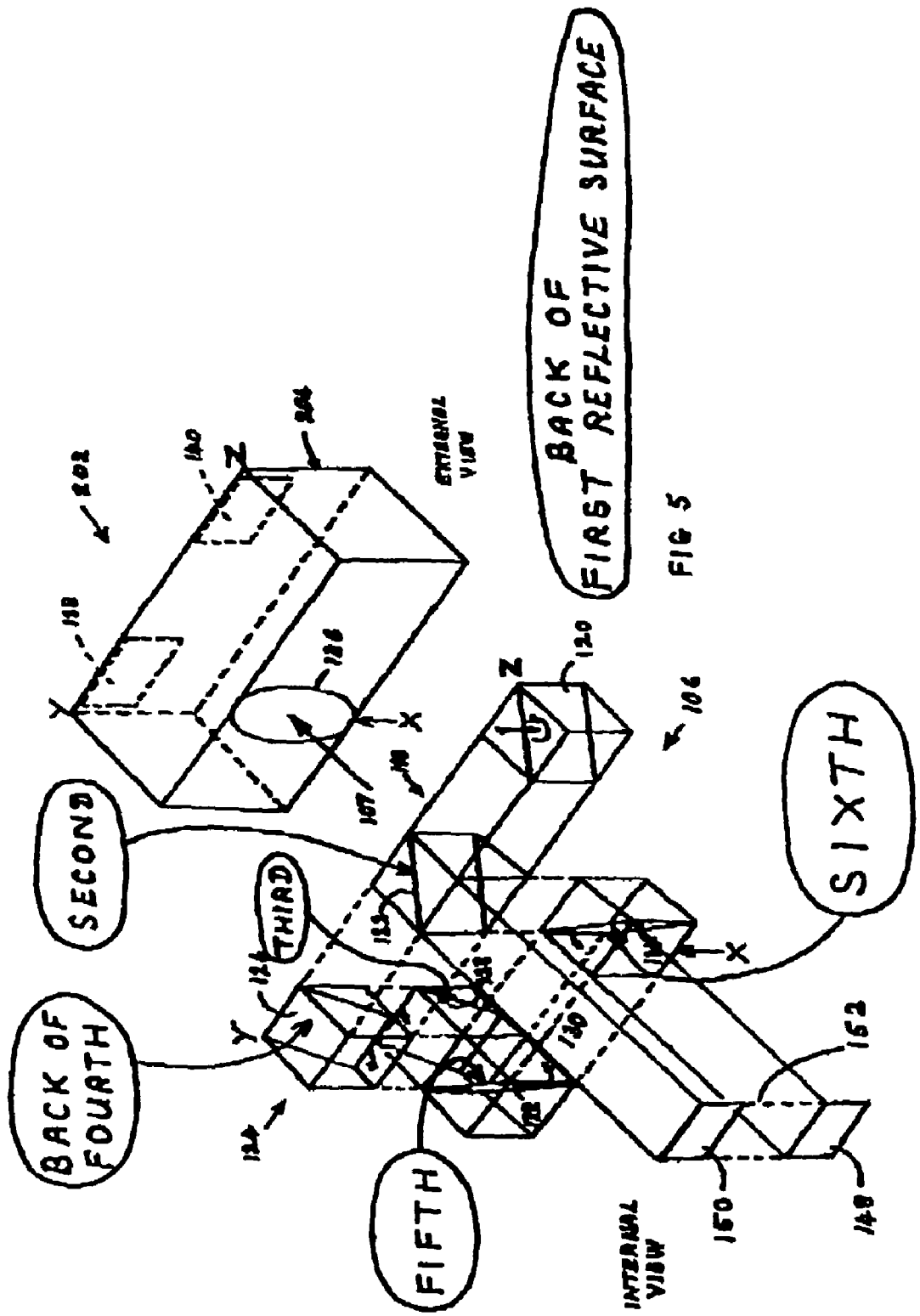
FIG. 5 shows first apparatus of the invention for the optical manipulation of a pair of landscape stereoscopic images.
Figure 6:
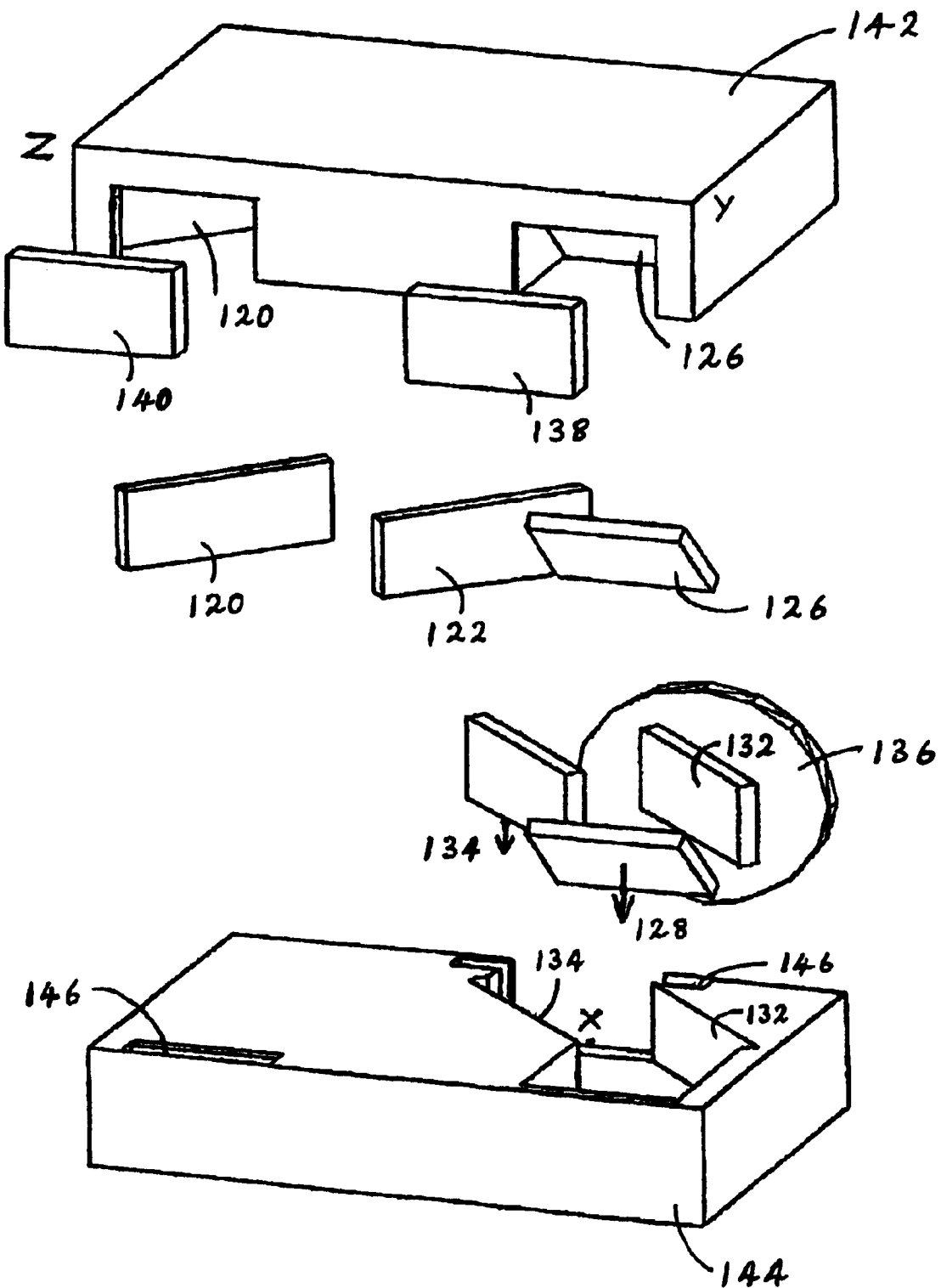
FIGS. 6-9 show second apparatus of the invention for the optical manipulation of a pair of landscape stereoscopic images.
Figure 7:
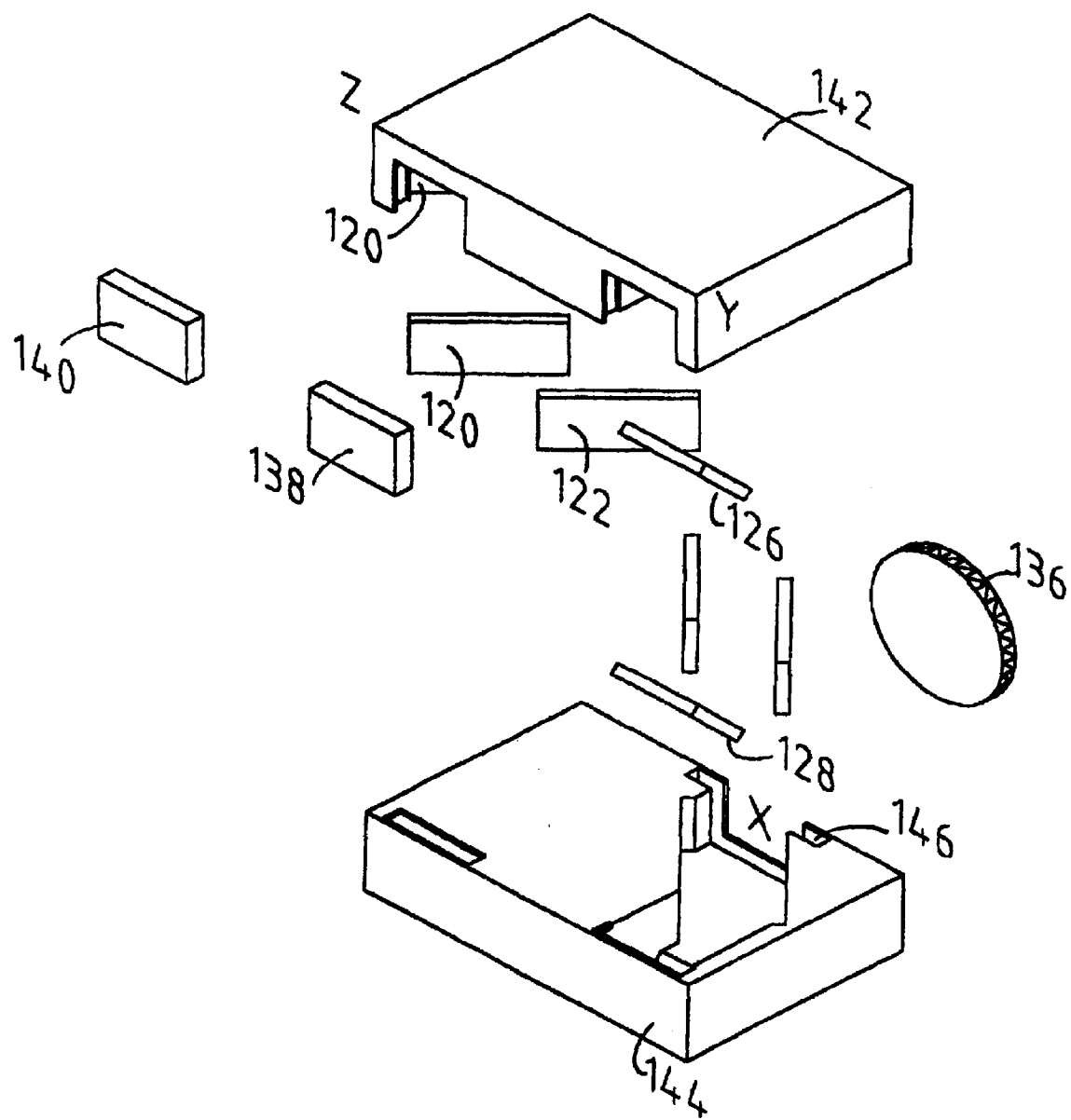
Figure 8:
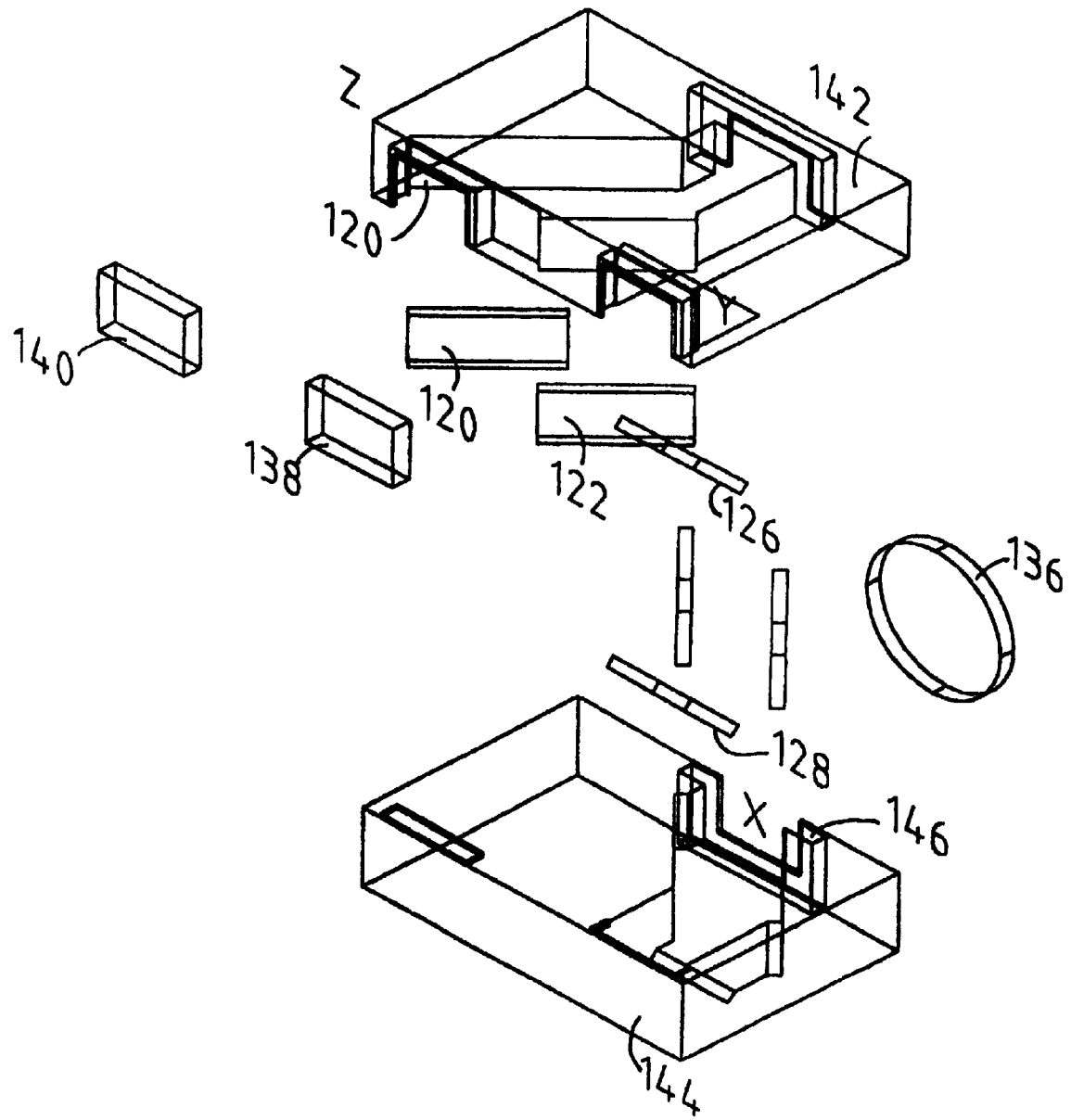
Figure 9:
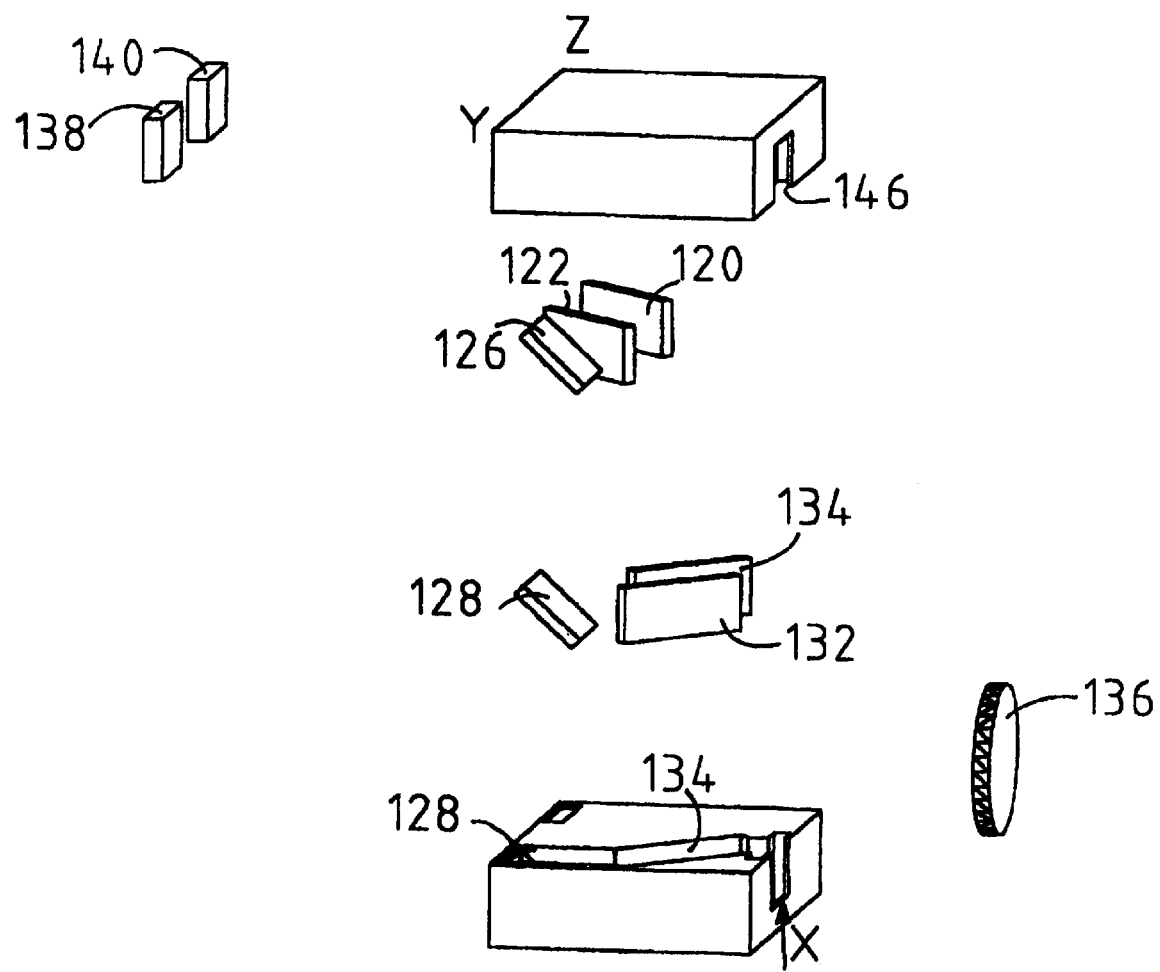

Referring now to FIG. 5, there is shown apparatus 202 of the present invention for the optical manipulation of a pair of landscape stereoscopic images. The apparatus 202 is shown in exploded wire frame form for clarity of illustration.

The apparatus 202 is in the form of a camera attachment. The apparatus 202 comprises a housing 204 and optical re-orientation means 106. The apparatus 202 is attached to a camera, which is not shown in FIG. 5 for clarity of illustration. The direction of attachment and the approximate positioning of the apparatus 202 to the camera is shown by arrow 107.

The optical re-orientation means 106 comprises a first periscope arrangement 108 which is horizontally orientated, which has first and second reflective surfaces 120, 122 respectively.

The optical re-orientation means 106 further comprises a second periscope arrangement 124 which is vertically disposed, which comprises third and fourth reflective surfaces 128, 126 respectively, and which looks through the fourth reflective surface 126.

The optical re-orientation means 106 still further comprises a third periscope arrangement 130 which is horizontally disposed, and which comprises fifth and sixth reflective surfaces 132, 134 respectively. The third periscope arrangement 130 looks through the fifth reflective surface 132 into the bottom of the second periscope arrangement 124 such that the camera looks into the reflective surface 128 and out of the reflective surface 126, after the reflective surfaces 134 and 132 respectively. The third periscope arrangement 130 is such that the sixth reflective surface 134 is positioned underneath (but staggered with respect to) the second reflective surface 122 so that the optical axis of the exit of the third periscope arrangement 130 is directly underneath the optical axis of the exit of the first periscope arrangement 108.

During use of the apparatus 202, the housing 204 will be placed over the first, second and third periscope arrangements 108, 124, 130 respectively. During use of the apparatus 202, the optical re-orientation means 106 is able to re-orient a pair of landscape stereoscopic images between a first orientation required for human viewing and a second orientation required for recording with a single camera, or for later or simultaneous viewing from a single screen.

The various reflective surfaces 120, 122, 126, 128, 132 and 134 shown in the first, second and third periscope arrangements 108, 124, 130 in FIG. 5 are in the form of plain mirrors. These plain mirrors form two separate optical paths which culminate with a common positive lens 136. Each of the two optical paths begins with a negative lens 138, 140. As used herein, references to a positive lens mean a convex lens, and references to a negative lens mean a concave lens. The convex and concave lenses may take various forms including, for example, double convex or planoconvex, and double concave or planoconcave.

In the apparatus 106 shown in FIG. 5, the path length through the mirror system between the positive lens 136 and each negative lens 138, 140 is the same. The positive lens 136 shares a focal plain with each negative lens 138, 140, such that light emerges parallel from the positive lens 136, compatible with a camera focused for "infinity" distance.

The mirror 120 may be rotated about a vertical axis C for the purpose of setting convergence between the two images (horizontal alignment).

The mirror 126 may be rotated about its upper edge for the initial set-up of vertical image content alignment.

The mirror 128 may be rotated about its lower edge to minimise or adjust the separation between the two images as recorded by the camera.

The mirror 132 and/or the mirror 134 may be rotated about their top or bottom edges to ensure that a vertical feature in one of the stereoscopic images is parallel with the same feature in the second image.

During use of the apparatus 106, only the mirror 120 needs to be adjustable in rotation by the camera user. The other settings may be achieved during initial set-up assembly.

For clarity of illustration in FIG. 5, the mirror location of each mirror is shown inside one of six identical blocks. Each block has a square base and a height similar to that of the two negative lenses 138, 140.

The apparatus 106 shown in FIG. 5 is advantageous in that the separation of the stereoscopic lenses may be changed in order to enhance the stereoscopic differences of the two images. More specifically, the mirror 120 may be moved in a first direction to the right. The mirror 126 is moved away from the mirror 122 by the same amount that the mirror 120 is moved away from the mirror 122. The mirrors 126, 128 and 132 do not move relative to each other. The mirrors 122 and 134 also do not move relative to each other. The mirrors 122 and 134 are fixed in relation to the camera. When the mirror 126 is moved, the two associated mirrors 128 and 132 move at the same time and with the mirror 126. At maximum separation of mirrors 126, 120 it is preferable for the negative lenses 138, 140 to share the same focal plain as the positive lens 136 by the camera, and the camera focus needs to be set for infinity. As the mirrors 126, 120 are brought together with the associated lenses 138, 140 respectively which move with the mirrors 126, 120 the two path lengths get shorter. Focus needs then to be compensated by adjusting the camera lens for a finite subject distance, such that the total combined power of the positive lens 136 and the camera's own lens is shortened by the same amount as the reduction in path length to the two negative lenses 138, 140.

In a modification of the apparatus shown in FIG. 5, a positive lens with straight edges, or lenses of other shapes, may be used.

Referring now to FIGS. 6-9 there are shown from different angles an exploded view of apparatus 302 for the optical manipulation of a pair of landscape stereoscopic images.

The apparatus 302 may be regarded as a simplified version of the apparatus 202 shown in FIG. 5. For ease of understanding, similar parts in FIGS. 5 and 6-9 have been given the same reference numerals.

The apparatus 302 comprises two blocks 142, 144 into which the upper level of optical components and the lower ones are held together as two sub-assemblies. The positive convex lens 136 is held in a recess 146 between two complete rims formed by bringing the two blocks 142, 144 together. There is still provision for rotating reflective surface 120 about a vertical axis. The lenses 138, 140 are negative lenses.

It is to be appreciated that the embodiment of the invention described above with reference to the accompanying drawings has been given by way of example only and that modifications may be effected. Thus for example either the three assembly structure of FIG. 5 or the simplified two assembly structure of FIGS. 6-9 may operate inverted. A system based on a mirror image construction would also function, but in this case, the wrong image of the pair would be stacked on top at the location of the positive lens 136, causing incompatibilities. The apparatus of the invention may be used to capture live images. These may be monitored in real time stereoscopically with a compatible viewer such as shown in FIG. 4 described above.

The invention claimed is:

1. Apparatus for the optical manipulation of a pair of landscape stereoscopic images, which apparatus comprises a housing, and optical re-orientation means positioned in the housing and for re-orientating the pair of landscape stereoscopic images between a first orientation selected from one of the orientations from the group consisting of top and bottom orientation and side-by-side orientation required for human viewing and a second orientation being the other orientation of the group required for recording with a single external camera positioned adjacent to the apparatus and viewed from a single screen, the single screen being such that it has a first pair of sides which are shorter than a second pair of sides, the second orientation being such that there is no top to bottom inversion of one of the landscape stereoscopic images with respect to the other of the landscape stereoscopic images, the second orientation being such that the landscape stereoscopic images are rotated for display in each of two halves of the single screen such that longest sides of the landscape stereoscopic images are parallel with the first pair of sides of the screen thereby maintaining a good aspect ratio without the need for compression or stretching of the pair of landscape stereoscopic images, and the optical re-orientation means being such that the pair of landscape stereoscopic images leave the optical re-orientation means in a direction which is parallel to a direction in which the pair of landscape stereoscopic images enter the optical re-orientation means, and the apparatus being characterised in that the optical re-orientation means comprises:

(i) a first periscope arrangement which is horizontally disposed, and which comprises first and second reflective surfaces;

(ii) a second periscope arrangement which is vertically disposed, which comprises third and fourth reflective surfaces, with the third reflective surface being the lower reflective surface for reflecting out image light towards the single camera; and (iii) a third periscope arrangement which is horizontally disposed, which comprises fifth and sixth reflective surfaces, wherein the fifth reflective surface is facing and aligned with the third reflective surface of the second periscope arrangement, and which is such that the sixth reflective surface is positioned underneath the second reflective surface so that the optical axis of the exit of the third periscope arrangement is directly underneath the optical axis of the exit of the first periscope arrangement.

2. Apparatus according to claim 1 in which the reflective surfaces are prism reflective surfaces.

3. Apparatus according to claim 1 in which the reflective surfaces are mirror reflective surfaces.

4. Apparatus according to claim 1 in which the separation of two lenses, analogous to eye separation distance, is able to be varied below a maximum.

5. Apparatus according to claim 1 in which the left edges and the right edges of the stereoscopic pair of images are able to be aligned by rotation of the first reflective surface about a vertical axis.

6. Apparatus according to claim 1 in which at least some of the reflective surfaces are located in blocks.

* * * * *